United States Patent [19]
Morgan et al.

[11] Patent Number: 4,836,633
[45] Date of Patent: Jun. 6, 1989

[54] OPTICAL CONNECTING ARRANGEMENTS

[75] Inventors: Peter J. Morgan, Allen, Tex.; Andrew C. Carter, Northamptonshire, England; Richard Davis, Northamptonshire, England; Frederick A. Randle, Northamptonshire, England

[73] Assignee: Plessey Overseas Limited, Ilford, England

[21] Appl. No.: 939,518

[22] PCT Filed: Mar. 24, 1986

[86] PCT No.: PCT/GB86/00166
  § 371 Date: Jan. 23, 1987
  § 102(e) Date: Jan. 23, 1987

[87] PCT Pub. No.: WO86/05596
  PCT Pub. Date: Sep. 25, 1986

[30] Foreign Application Priority Data
  Mar. 22, 1985 [GB] United Kingdom ............ 8507560

[51] Int. Cl.[4] ................... G02B 6/32; G02B 6/36
[52] U.S. Cl. ........................... 350/96.18; 350/96.20
[58] Field of Search ........... 357/74, 19; 350/96.15, 350/96.18, 96.20; 250/227

[56] References Cited

U.S. PATENT DOCUMENTS

| | | | |
|---|---|---|---|
| 4,186,995 | 2/1980 | Schumacher | 350/96.18 |
| 4,307,934 | 12/1981 | Palmer | 350/96.20 |
| 4,357,072 | 11/1982 | Goodfellow et al. | 350/96.20 |
| 4,383,731 | 5/1983 | Simon et al. | 350/96.18 |
| 4,427,879 | 1/1984 | Becher et al. | 350/96.18 X |
| 4,575,194 | 3/1986 | Strefer et al. | 350/96.18 X |
| 4,653,847 | 3/1987 | Berg et al. | 350/96.18 X |
| 4,658,130 | 4/1987 | Durbin | 350/96.20 X |

FOREIGN PATENT DOCUMENTS

| | | | |
|---|---|---|---|
| 2428328 | 4/1980 | France . | |
| 0113005 | 9/1980 | Japan | 350/96.18 |
| 0069792 | 4/1982 | Japan . | |
| 0145909 | 8/1983 | Japan | 350/96.18 |
| 0184911 | 10/1983 | Japan . | |
| 0160116 | 9/1984 | Japan . | |
| 2086074 | 5/1982 | United Kingdom . | |

OTHER PUBLICATIONS

"A GaAlAs Edge Emitting LED with a Lunched Power in Excess of 1W", by Davies, Standard Telecommunications Lab: Ltd. Sep. 1980.

Primary Examiner—William L. Sikes
Assistant Examiner—Akm E. Ullah
Attorney, Agent, or Firm—Fleit, Jacobson, Cohn & Price

[57] ABSTRACT

An optical connecting arrangement is provided between an optical device and an optical fibre in which the optical device is mounted with positional precision on a substrate which is fabricated for locating one end of a so-called grin rod lens in precise optical alignment with the active surface of the optical device and in which the other end of the same grin rod lens or the corresponding end of a further grin rod lens coupled to it has the optical fibre optically coupled thereto in optical alignment.

4 Claims, 3 Drawing Sheets

OPTICAL CONNECTING ARRANGEMENTS

This invention relates to optical connecting arrangements providing for the precise optical alignment of optical fibres relative to the active or operational surfaces of optical devices (e.g. light generating devices, such as light emitting diodes and lasers, light responsive devices, such as photo-diodes and photo-transistors or light modulating devices).

According to the present invention there is provided an optical connecting arrangement between an optical device (e.g. light generating or light responsive device) and an optical fibre in which the optical device is mounted with positional precision on a substrate which is fabricated for locating one end of a so-called GRIN rod lens in precise optical alignment with the active surface of the optical device mounted on said substrate and in which the other end of the same GRIN rod lens or the corresponding end of a further GRIN lens coupled to it has the optical fibre optically coupled thereto in optical alignment.

In carrying out the present invention the substrate on which the optical device is mounted may be fabricated with a relatively deep cylindrical well for receiving the end of the aforesaid GRIN rod lens which is preferably enclosed within a close fitting ferrule (e.g. metal) the end of which is a precision fit in the cylindrical well of the substrate and may be metallically or otherwise securely bonded to the substrate.

The relatively deep well of the substrate in the case of many substrate materials, including silicon, may be produced by well-known etching techniques (e.g. photolithographic etching, sputter etching, reactive ion etching and chemical etching) according to the particular material employed for the substrate.

For the purpose of attaching an optical device to the substrate so that the device is accurately located relative to the position of the end of the GRIN rod lens the device may be provided with an array or pattern of accurately positioned metallic bonding pads arranged to be bonded to correspondingly positioned pads or equivalent on the substrate.

To facilitate the bonding of the optical device to the substrate the metallic bonding pads on the substrate and/or the optical device may be coated with solder or solder bumps provided and so-called solder reflow self-aligning techniques then employed to actually effect bonding of the device to the substrate. The manner in which the metallic bonding pads may be formed on the substrate and the optical device and the solder reflow techniques are fully described in our co-pending patent application No. (84 08877). The solder flow self-aligning bonding techniques eliminate the need for costly manual alignment techniques for the location of the optical devices relative to the substrates.

The substrate material is preferably silicon which is readily available at moderate cost and which has good thermal conductivity thereby enabling the substrate to function as an effective heat sink structure. Moreover, processing technology (e.g. etching, doping, metallisation etc) associated with silicon is already well developed and, moreover, the semiconductor properties may be used to provide for example an integral substrate driver transistor for driving a light emitting diode mounted on the substrate as aforesaid.

The present invention enables optical devices mounted on substrates to be optically aligned with optical fibres in a highly controlled and repeatable process suitable for large volume manufacture.

By way of example a number of embodiments of the present invention will now be described with reference to the accompanying drawings in which.

Figure 1:
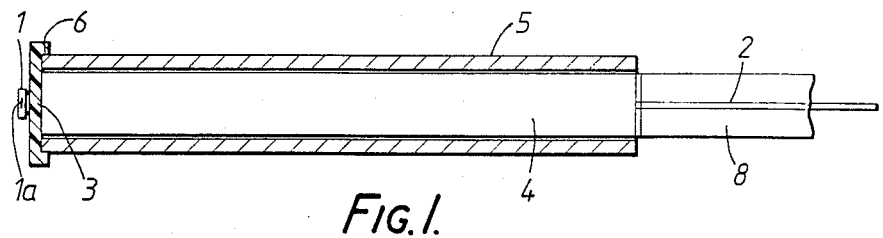
FIG. 1 is a part cross-sectional side view of an optical connecting arrangement according to the present invention.
Figure 7:
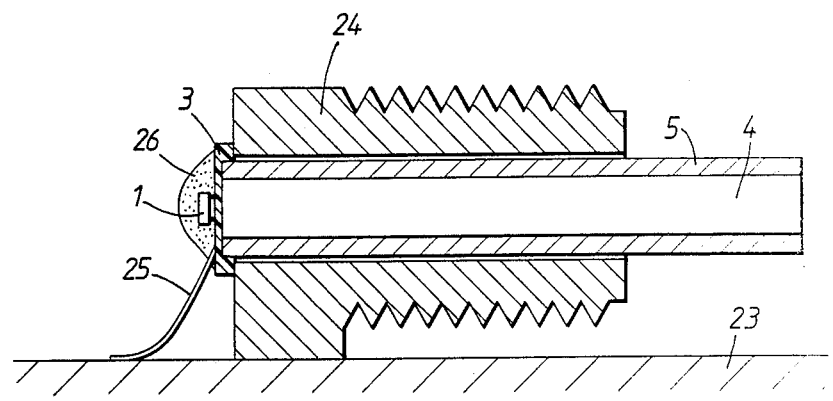
Figure 8:
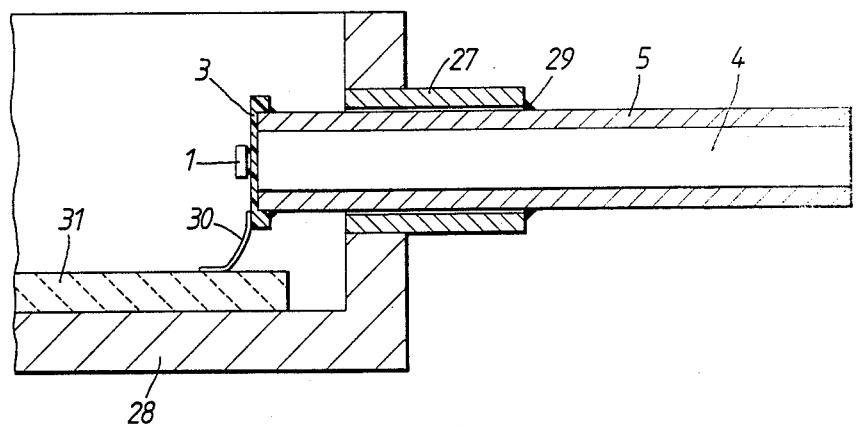

FIG. 7 shows a part cross-sectional side view of an optical connecting arrangement as shown in FIG. 1 embodied in a practical optical connector mounting and interconnecting arrangement; and, FIG. 8 shows a part cross-sectional side elevational view of an optical connecting arrangement as shown in FIG. 1 incorporated in an alternative practical optical connector mounting/interconnecting arrangement to that shown in FIG. 7.

Referring to FIG. 1 of the drawings this shows an optical connecting arrangement for the precision optical alignment of the optically active surface region of an optical device 1 embodying for example a light emitting diode or photo-diode 1a with an optical fibre 2.

In accordance with the invention the optical device 1 is bonded to a preferably rectangular substrate 3 which is substantially transparent to light radiation and which may advantageously be composed of silicon for the reasons previously mentioned. Although the silicon of substrate 8 is transparent up to 1.3 m light radiation transmitted through the substrate from the optical fibre 2 to the optical device 1, or vice versa, it does have a large refractive index (3.5) which causes significant reflection loss. However, this loss can be virtually eliminated by coating the substrate 3 with an anti-reflective coating which will be referred to later. The substrate 3 and the optical fibre 2 are optically linked by means of a graded index (GRIN) rod lens 4. For the purpose of achieving precise optical alignment of the left hand end of the GRIN rod lens 4 with the active surface region of the optical device 1 the positioning of the optical device 1 on the substrate needs to be accurately predetermined relative to the location of the GRIN lens 4 where it abuts against the substrate. As can best be seen from FIG. 2, such precise relative positioning may be achieved in the present embodiment by enclosing the GRIN rod lens 4 in a close fitting, preferably metal, precision ferrule 5 the end of which is received by a relatively deep cylindrical recess or well 6 (50 m or more) formed in the substrate 3 on the surface thereof remote from the optical device 1. The end of the ferrule 5 may be bonded to the substrate 3 at 12 using epoxy/adhesive or solder to provide a hermetic seal. This recess 6 may be formed, as well as located relative to the bonded position of the optical device, with a high level of precision by the use of well-known etching techniques. Sputter etching or reactive ion etching techniques are preferred because they especially produce substrate recesses having well-defined perpendicular or near perpendicular walls. It will be appreciated therefore that the substrates and ferrules 5 serve to provide precise registration of the GRIN rod lens 4 and the optical device 1 so that the optical axes 7 thereof are in precise optical alignment (i.e. coincident). Alignment of the optical fibre 2 with the axis of the rod lens 4 may readily be achieved by arranging that the fibre is a close fit within a tubular guide structure 8 of the same outer diameter as the rod lens 4 and by extending the ferrule 5 so that it also encloses the guide structure 8 or by providing a cylindrical interconnecting shell structure which secures the guide structure 8 to the ferrule 5.

Figure 2:
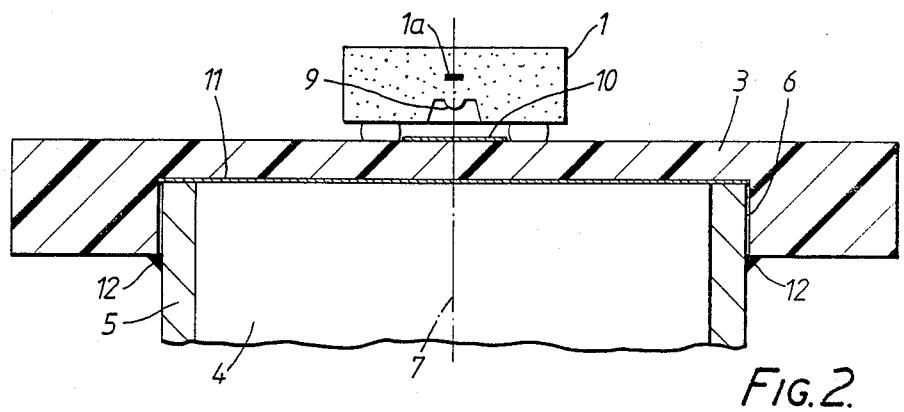
FIG. 2 is a cross-sectional enlarged view of the substrate and associated optical device forming part of the optical connecting arrangement shown in FIG. 1.

As will be seen in FIG. 2, the optical device 1 may be formed on its under-surface, as by etching, with an integral micro-lens 9. It may here be mentioned that micro-lensing is essential for light emitting diodes since the GRIN rod lens by itself is insufficient as an optical element. In other embodiments the substrate 3 could alternatively be formed with a micro-lens or a micro-lens could be interposed between the optical device and the substrate.

As previously mentioned the silicon of the substrate 1 has a relatively high refractive index and to avoid reflective loss anti-reflective coatings may be provided as indicated at 10 and 11 on the substrate surfaces.

Figure 3:
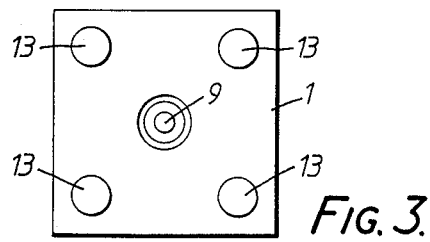
FIG. 3 shows an underneath view of an exemplary optical device of FIG. 2.
Figure 4:
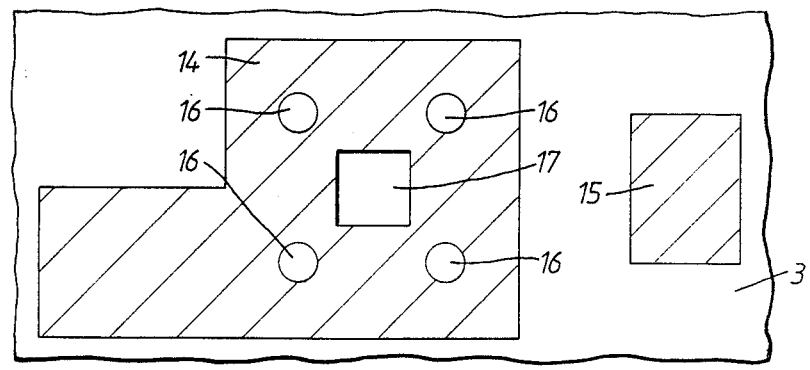
FIG. 4 shows a plan view of a fragment of an exemplary substrate of FIG. 2.

Referring also to FIGS. 3 and 4 these illustrate the manner of metallically bonding the optical device 1 to the substrate 3 using so-called solder reflow/self-alignment techniques. As can best be seen from FIG. 3 the under-surface of the optical device 1 is provided with a pattern of four circular metal bonding pads or lands 13. The position of these pads relative to the optical axis 7 of the device 1 which coincides with the optical axis of the micro-lens 9 may be accurately predetermined by a photo-lithographic etching technique by which parts of the metal coating applied to the underside of the device are etched away to leave four solder-wettable metal pads 13. The surface of the substrate 3 to which the optical device is to be attached is provided with metallized regions 14 and 15 as indicated in FIG. 4. These metallized regions which may be produced with dimensional and positional precision by well-known etching techniques previously referred to facilitate the making of electrical connections to the optical device 1 when bonded to the substrate 3. To facilitate bonding of the device 1 to the substrate 3 solder bumps 16 are deposited with positional precision on the metallised region 14. With the metallic bonding pads 13 of the optical device 1 held by positioning means in registration with the respective solder bumps 16 the solder may be melted to effect solder reflow bonding of the device 1 to the substrate 3, the optical device 1 being finally aligned with precision relative to the substrate without the need for human intervention due to the surface tension effects of the solder when in a molten condition. As can be seen in FIG. 4 the metallized region 14 is provided with a window 17 to enable light radiation to be transmitted through the substrate 3 to or from the optical device 1.

It may here be mentioned that the accurate location of the metallization regions 14 and 15 and the solder bumps 16 relative to the etched well 6 on the reverse side of the substrate 3 can be achieved by the use of front-to-back etching mask aligners.

It may also be mentioned that although the foregoing description has been confined to the fabrication and bonding of a single optical device to a single substrate in practice many hundreds of substrates may be fabricated simultaneously from a single silicon wafer (e.g. substrate chips of 3 mm×3 mm from a 3 inch diameter wafer). Automatic die positioning equipment can then be used to position a multiplicity of optical device chips on the substrate array for simultaneous solder reflow-/alignment bonding to the substrates. Thereafter these substrates with their respective optical devices may be broken or cut from the array to provide separate optical device/substrate units.

Figure 5:
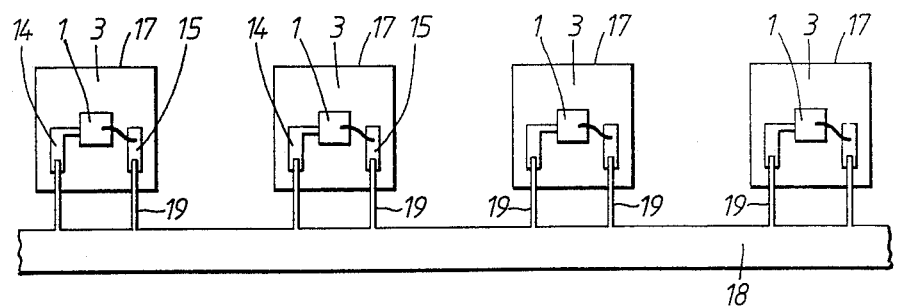
FIG. 5 shows a plurality of substrates with associated optical devices interconnected through metallised lands or pads formed on the substrates and strip bus/leads.

Referring now to FIG. 5 this shows a plurality of optical device/substrate units 17 connected to a bus strip 18 via strip leads 19 (e.g. photo-etched leads). After the interconnections are made to the respective units the units may be bonded to the individual precision ferrules 5 (FIGS. 1 and 2) for receiving the GRIN rod lenses 4. The etched well 6 in each substrate 3 optically aligns the optical device 1 with the central axis of the precision ferrule with a tolerance that is defined by the tolerance of the outside diameter of the ferrule (i.e. ±5 microns or better) and a tolerance of the well to the solder bump metallization on the reverse side of the substrate (i.e. ±3 microns or better).

Figure 6A:
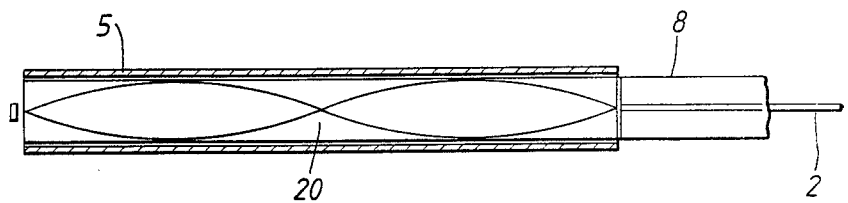
FIGS. 6a and 6b are diagrams illustrating different rod lens configurations for use in optical connecting arrangements according to the present invention.
Figure 6B:
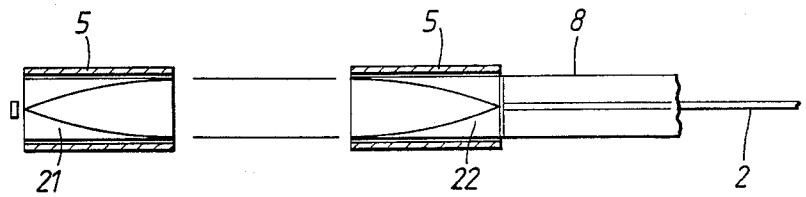

The GRIN rod lens arrangement of the assembly may comprise a full pitch rod lens as illustrated in FIG. 6a. The full pitch lens shwon at 20 is preferred to a half pitch rod lens since the former produces zero lateral beam displacement. However, a quarter pitch GRIN lens arrangement comprising spaced lenses 21 and 22 as shown in FIG. 6b ray alternatively be employed to provide an expanded beam connector arrangement.

In FIG. 7 an optical connecting arrangement according to the invention comprises an optical device/substrante unit and associated GRIN rod lens/ferrule structure is mounted on a flanged support structure 23 by means of a screw threaded tubular mount structure 23 by means of a screw threaded tubular mount structure24. Integral connections between the previously mentioned metallic regions of the substance 3 and the mounting surface may be made by means of one or more electrical connecting leads 25. The optical device 1 may be encapsulated in suitable conformal coating material 26 as shown. An alternative mounting arrangement for an optical connecting arrangement of the invention is shown in FIG. 8. In this arrangement the precision ferrule 5 carrying the GRIN rod lens is supported by means of a bush 27 in a mounting structure 28 and hermetically sealed at 29. Electrical connections to the substance 3 are made by way of electrical leads 30 connected to a ceramic substance 31 which may carry associated thick/thin film hybrid or integrated circuitry.

As previously mentioned, the use of a silicon substrate or a substrate of other semiconductor material ,such as InP, enables the substrate to be used to embody driver transistors for light emitting diode optical devices so that the latter can be driven directly with a minimun of parasitic inductance, or the gain of a photo-diode optical device can be added to the low level photocurrent with a low level of interconnect capacitance. Minimising such parasitic inductances and capacitances is especially important as data rates in optical links increase.

As will be appreciated from the foregoing description of various embodiments of the present invention the present invention facilitates the highly controlled, repeatable, large volume manufacture of optical connectors avoiding many costly manual techniques currently used in the production of such arrangements.

Although the specific embodiment have incorporated light responsive or light generating optical devices it will readily be appreciated that other forms of optical devices (e.g. light modulating devices such as oscillatory mirrors) could alternatively be employed.

We claim:

1. An optical coupling arrangement between an optical device and an optical fibre, comprising an optically transparent substrate to one surface of which the optical device is attached by means of an array of boned connections made between corresponding precisely positioned metal bonding pads provided on the optical device and substrate, the other surface of the substrate having formed therein a cylindrical recess located in precise positional relationship with the boned connections between the optical device and the substrate and receiving one end of a GRIN rod lens so that the end of the lens is located in very close proximity and centralized with respect to an active surface of the optical device, the other end of the GRIN rod lens having the optical fibre coupled thereto in abutting precise optical alignment.

2. An optical coupling arrangement as claimed in claim in 1, in which the metallic bonding pads on the optical device and substrate include solder to facilitate solder reflow self-alignment bonding of the optical device to the substrate.

3. An optical coupling arrangement as claimed in claim 1, in which the GRIN rod lens is enclosed within a close fitting ferrule, one end of which is a precise fit in the cylindrical recess of the substrate, in which the ferrule is bonded to the substrate and in which the optical fibre is held centrally within a cylindrical guide member which is a precise fit in the other end of the ferrule containing the GRIN rod lens.

4. An optical coupling arrangement as claimed in claim 2, in which the GRIN rod lens is enclosed within a close fitting ferrule, one end of which is a precise fit in the cylindrical recess of the substrate, in which the ferrule is bonded to the substrate and in which the optical fibre is held centrally within a cylindrical guide member which is a precise fit in the other end of the furrule containing the GRIN rod lens.

* * * * *